US012089256B2

(12) United States Patent
Jiang et al.

(10) Patent No.: US 12,089,256 B2
(45) Date of Patent: Sep. 10, 2024

(54) RANDOM ACCESS METHOD AND DEVICE, ELECTRONIC DEVICE AND COMPUTER-READABLE STORAGE MEDIUM

(71) Applicant: BEIJING XIAOMI MOBILE SOFTWARE CO., LTD., Beijing (CN)

(72) Inventors: Xiaowei Jiang, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 777 days.

(21) Appl. No.: 17/261,867

(22) PCT Filed: Jul. 25, 2018

(86) PCT No.: PCT/CN2018/097098
§ 371 (c)(1),
(2) Date: Jan. 20, 2021

(87) PCT Pub. No.: WO2020/019213
PCT Pub. Date: Jan. 30, 2020

(65) Prior Publication Data
US 2021/0298086 A1    Sep. 23, 2021

(51) Int. Cl.
*H04W 74/0833* (2024.01)
*H04L 5/00* (2006.01)

(52) U.S. Cl.
CPC ....... *H04W 74/0833* (2013.01); *H04L 5/0048* (2013.01)

(58) Field of Classification Search
None
See application file for complete search history.

(56) References Cited

U.S. PATENT DOCUMENTS 11,368,894 B2 *  6/2022  Hui ...................... H04W 36/36
2014/0120926 A1 * 5/2014  Shin ..................... H04W 48/12
                                                                455/450
(Continued)

FOREIGN PATENT DOCUMENTS

CN   108111286 A   6/2018
CN   108235444 A   6/2018
(Continued)

OTHER PUBLICATIONS

CN NOA in Application No. 201880001241.4, mailed on Oct. 9, 2019.
(Continued)

*Primary Examiner* — Nicholas Sloms
(74) *Attorney, Agent, or Firm* — Syncoda LLC; Feng Ma

(57) ABSTRACT

A random access method includes: when initiating random access, determining a measurement result of channel state information measurement reference signals (CSI-RS) of a plurality of beams; determining a target beam corresponding to a target CSI-RS having a measurement result greater than a preset threshold value; determining a target Synchronization Signal Block (SSB) corresponding to the target CSI-RS; determining a random access preamble and random access timing associated with the target SSB; and initiating random access on the target beam based on the random access preamble and the random access timing. A beam can be determined according to the measurement result of an CSI-RS, without determining the beam according to the measurement result of an SSB, thereby preventing the problem of user equipment (UE) being unable to select a suitable beam for random access due to a measurement result of an SSB not being obtained for a downlink BWP by UE.

12 Claims, 7 Drawing Sheets

(56) References Cited

U.S. PATENT DOCUMENTS

| | | | |
|---|---|---|---|
| 2019/0110300 A1* | 4/2019 | Chen | H04W 72/23 |
| 2019/0215870 A1* | 7/2019 | Babaei | H04L 5/0053 |
| 2019/0223222 A1* | 7/2019 | Nagaraja | H04B 7/088 |
| 2019/0297537 A1* | 9/2019 | Tsai | H04W 36/0016 |
| 2019/0320469 A1* | 10/2019 | Huang | H04W 72/23 |
| 2019/0356439 A1* | 11/2019 | Lee | H04L 5/0048 |
| 2019/0357262 A1* | 11/2019 | Cirik | H04W 76/27 |
| 2020/0015236 A1* | 1/2020 | Kung | H04B 7/04 |
| 2020/0059398 A1* | 2/2020 | Pan | H04B 7/0695 |
| 2020/0068416 A1* | 2/2020 | Kang | H04W 72/21 |
| 2020/0100301 A1* | 3/2020 | Kusashima | H04W 72/23 |
| 2020/0137800 A1* | 4/2020 | Takahashi | H04L 5/005 |
| 2020/0154377 A1* | 5/2020 | Qian | H04W 74/0833 |
| 2020/0245200 A1* | 7/2020 | Xiong | H04W 36/0058 |
| 2020/0275479 A1* | 8/2020 | Peisa | H04W 74/0833 |
| 2020/0404700 A1* | 12/2020 | Li | H04W 74/006 |
| 2021/0037575 A1* | 2/2021 | Ohara | H04W 74/0833 |
| 2021/0195657 A1* | 6/2021 | Wu | H04L 5/0044 |
| 2021/0352734 A1* | 11/2021 | Svedman | H04W 72/1263 |

FOREIGN PATENT DOCUMENTS

| | | |
|---|---|---|
| CN | 108282898 A | 7/2018 |
| CN | 109121223 A | 1/2019 |

OTHER PUBLICATIONS

International Search Report in Application No. PCT/CN2018/097098 , mailed on Apr. 28, 2019.

3GPP TSG-RAN WG2 Meeting #102, Busan, Korea, May 21-25, 2018, R2-1807266, Change Request, Title: Correction to support beam failure recovery procedure.

3GPP TSG RAN WG1 Meeting #92, Athens, Greece, Feb. 26-Mar. 2, 2018, R1-1801410, Title: Remaining details of RACH procedure.

* cited by examiner

RANDOM ACCESS METHOD AND DEVICE, ELECTRONIC DEVICE AND COMPUTER-READABLE STORAGE MEDIUM

CROSS-REFERENCE TO RELATED APPLICATIONS

The present application is a national stage of International Application No. PCT/CN2018/097098 filed on Jul. 25, 2018, the disclosure of which is hereby incorporated by reference in its entirety.

TECHNICAL FIELD

The present disclosure relates to the field of communication technology, and in particular, to a random access method, a random access device, electronic equipment, and a computer-readable storage medium.

BACKGROUND

In related technologies, when user equipment initiates a random access, it needs to select an appropriate beam, and the selection of the beam is determined by detecting certain parameters of the beam. For example, when the initiated random access is contention based random access (CBRA), the user equipment needs to determine whether or not signal quality of the beam meets the requirements according to a measurement result of a Synchronization Signal Block (SSB).

Generally speaking, the user equipment can determine the measurement result of the SSB by detecting the SSB of downlink Band Width Part (BWP). However, in some cases, the user equipment does not obtain the SSB measurement for the downlink BWP, which cause the user equipment to be unable to select a suitable beam for the random access.

SUMMARY

In view of this, the embodiments of the present disclosure propose a random access method, a random access device, an electronic device, and a computer-readable storage medium.

According to a first aspect of the embodiments of the present disclosure, there is provided a random access method. The random access method includes: in response to initiating a random access, determining measurement results of Channel State Information Reference Signals (CSI-RS) of a plurality of beams; determining a target beam corresponding to a target CSI-RS of which the measurement result is greater than a preset threshold; determining a target synchronization signal block (SSB) corresponding to the target CSI-RS; determining a random access preamble and a random access occasion associated with the target SSB; and initiating the random access on the target beam based on the random access preamble and the random access occasion.

Optionally, the random access method further includes before determining the measurement results of CSI-RSs of the plurality of beams, determining whether there is an available measurement result of a SSB in a downlink bandwidth part corresponding to the initiated random access; wherein, in response to there is no available measurement result of the SSB in the downlink bandwidth part corresponding to the initiated random access, determining the measurement results of the CSI-RSs of the plurality of beams.

Optionally, in response to that the initiated random access is a non-contention random access triggered due to beam failure recovery (BFR), and a reference signal resource of a candidate beam of the BFR is the SSB, said determining whether there is the available measurement result of the SSB in the downlink bandwidth part corresponding to the initiated random access includes determining whether there is an available measurement result of the SSB in a downlink bandwidth part corresponding to the initiated non-contention random access, wherein, in response to there is no available measurement result of the SSB in the downlink bandwidth part corresponding to the initiated non-contention random access, said determining the measurement results of the CSI-RSs of the plurality of beams includes: determining the measurement result of the CSI-RS associated with the SSB corresponding to the candidate beam.

Optionally, said determining the target SSB corresponding to the target CSI-RS includes determining a target SSB that is quasi-colocated with the target CSI-RS.

Optionally, said determining the target SSB quasi-colocated with the target CSI-RS includes determining a target SSB that is quasi-colocated with a spatial reception parameter of the target CSI-RS.

Optionally, said determining the target SSB corresponding to the target CSI-RS includes determining the target SSB corresponding to the target CSI-RS according to an association relationship between the CSI-RS and the SSB configured by a base station.

Optionally, the preset threshold is determined based on a radio resource control message sent by a base station.

According to a second aspect of the embodiments of the present disclosure, there is provided a random access device. The random access device includes a measurement result determination module configured to determine measurement results of Channel State Information Reference Signals (CSI-RS) of a plurality of beams, in response to initiating a random access; a beam determination module configured to determine a target beam corresponding to a target CSI-RS of which the measurement result is greater than a preset threshold; a SSB determination module configured to determine a target synchronization signal block (SSB) corresponding to the target CSI-RS; a random access determination module configured to determine a random access preamble and a random access occasion associated with the target SSB; and a random access initiation module configured to initiate the random access on the target beam based on the random access preamble and the random access occasion.

Optionally, the random access device further includes an available determination module configured to determine whether there is an available measurement result of a SSB in a downlink bandwidth part corresponding to the initiated random access before determining the measurement results of CSI-RSs of the plurality of beams by the measurement result determination module; wherein, in response to there is no available measurement result of the SSB in the downlink bandwidth part corresponding to the initiated random access, the measurement result determination module is configured to determine the measurement results of the CSI-RSs of the plurality of beams.

Optionally, in response to that the initiated random access is a non-contention random access triggered due to beam failure recovery (BFR), and a reference signal resource of a candidate beam of the BFR is the SSB, the available determination module is configured to determine whether there is the available measurement result of the SSB in the downlink bandwidth part corresponding to the initiated random access; wherein in response to there is no available measurement result of the SSB in a downlink bandwidth part corresponding to the initiated non-contention random access, the measurement result determination module is configured to determine the measurement result of the CSI-RS associated with the SSB corresponding to the candidate beam.

Optionally, the SSB determination module includes a quasi-colocation sub-module configured to determine a target SSB that is quasi-colocated with the target CSI-RS.

Optionally, the quasi-colocation sub-module is configured to determine a target SSB that is quasi-colocated with a spatial reception parameter of the target CSI-RS.

Optionally, the SSB determination module includes an association relationship sub-module configured to determine the target SSB corresponding to the target CSI-RS according to an association relationship between the CSI-RS and the SSB configured by a base station.

Optionally, the preset threshold is determined based on a radio resource control message sent by a base station.

According to a third aspect of the embodiments of the present disclosure, there is provided an electronic device. The electronic device includes: a processor; and memory for storing instructions executable by the processor; wherein the processor is configured to perform steps in the method according to any one of the above embodiments.

According to a fourth aspect of the embodiments of the present disclosure, there is provided a computer-readable storage medium having computer programs stored thereon, wherein when the instructions are executed by a processor, steps in the method according to any one of the above embodiments are implemented.

Based on the embodiments of the present disclosure, the beam can be determined according to the measurement result of the CSI-RS, and it is not necessary to determine the beam according to the measurement result of the SSB, thereby preventing the user equipment from failing to select a suitable beam to perform the random access due to the user equipment being unable to obtain the measurement result of the SSB for the downlink BWP, which ensures that the user equipment can select a beam that meets the requirements.

In addition, since the random access preamble and the random access occasion are not directly related to the CSI-RS, but are directly related to the SSB, so that the SSB corresponding to the CSI-RS can be further determined after the beam is determined, and then the random access preamble and random access occasion associated with the SSB can be determined, thus the user equipment can send the random access preamble to the base station at the random access occasion based on the beam that meets the requirements, so as to ensure the smooth progress of the random access process.

BRIEF DESCRIPTION OF THE DRAWINGS

In order to more clearly illustrate technical solutions in the embodiments of the present disclosure, the following will briefly introduce the drawings used in the description of the embodiments. Obviously, the drawings in the following description are only some of the embodiments of the present disclosure. For those of ordinary skill in the art, without having creative labor, other drawings may be obtained based on these drawings.

DETAILED DESCRIPTION

The technical solutions in the embodiments of the present disclosure will be described clearly and completely below in conjunction with the drawings in the embodiments of the present disclosure. Obviously, the described embodiments are only a part of the embodiments of the present disclosure, not all embodiments. Based on the embodiments in the disclosure, all other embodiments obtained by a person of ordinary skill in the art without creative work fall within the scope of protection of this disclosure.

Figure 1:
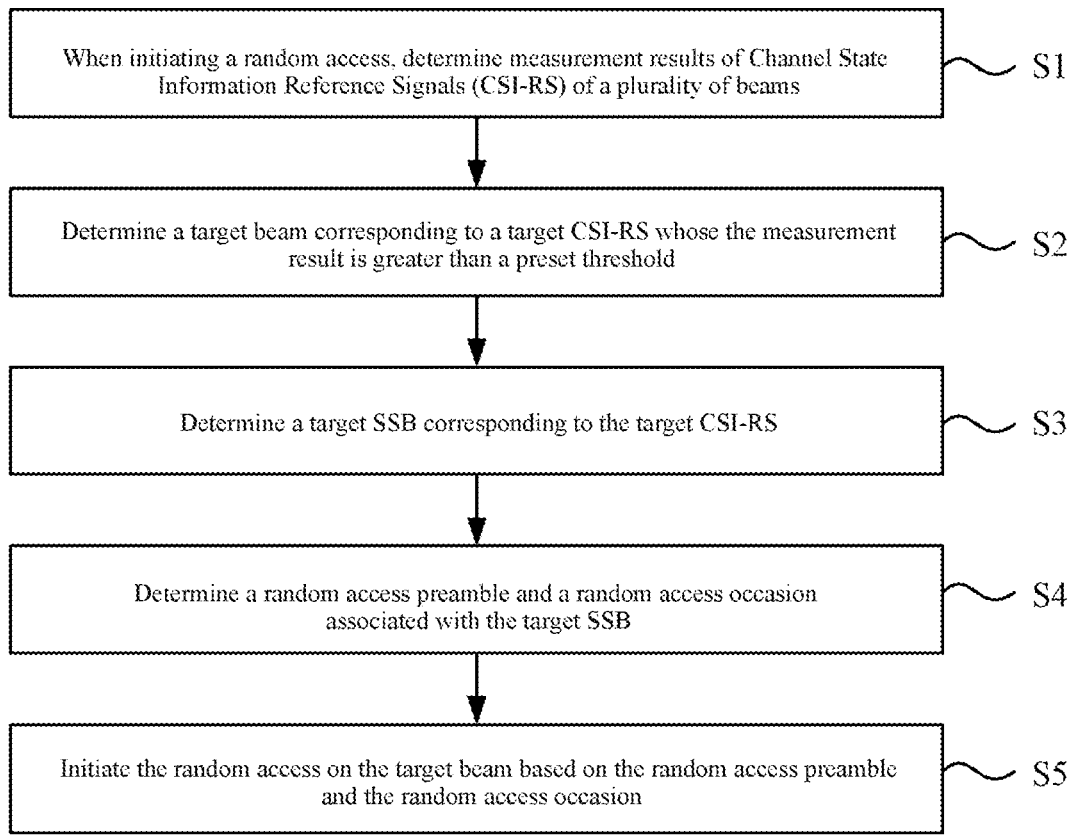
FIG. 1 is a schematic flowchart of a random access method according to an embodiment of the present disclosure.

FIG. 1 is a schematic flowchart of a random access method according to an embodiment of the present disclosure. The random access method shown in this embodiment can be applied to user equipment, such as mobile phones, tablet computers, and smart wearable devices (bracelets, watches, helmets, glasses, etc.). The user equipment can communicate with a base station, for example, based on Long Term Evolution (LTE), and can also communicate with a base station based on New Radio (NR).

As shown in FIG. 1, the random access method may include the following steps.

In step S1, when a random access is initiated, measurement results of Channel State Information Reference Signals (CSI-RS) of a plurality of beams are determined.

In step S2, a target beam corresponding to a target CSI-RS is determined, wherein the measurement result of the target CSI-RS is greater than a preset threshold.

In an embodiment, the beam may be associated with the CSI-RS, and based on the measurement result of the CSI-RS, quality of the beam may be determined. The measurement result on which the quality of the beam is based can be selected as required. For example, the measurement result can be Reference Signal Receiving Power (RSRP), and the preset threshold can also be set as required. If the measurement result is greater than the preset threshold, it can be determined that the beam quality of the beam determined by the CSI-RS corresponding to the measurement result meets the requirements.

In an embodiment, after determining the measurement results of CSI-RSs, if there are multiple measurement results greater than the preset threshold, the user equipment may select a measurement result from the multiple measurement results based on a pre-stored configuration message and use a CSI-RS corresponding to the measurement result as the target CSI-RS. For example, a CSI-RS corresponding to the largest measurement result can be selected as the target CSI-RS, while when the beams are configured with priorities, a CSI-RS corresponding to a higher priority can be selected as the target CSI-RS.

In an embodiment, the CSI-RS associated with the SSB may be determined firstly, and then the measurement result may be determined for the CSI-RS associated with the SSB, so that it can be ensured that the determined target CSI-RS is associated with the SSB, thereby making a target SSB corresponding to the target CSI-RS can be determined subsequently.

In step S3, a target synchronization signal block (SSB) corresponding to the target CSI-RS is determined.

In an embodiment, an association relationship between the CSI-RS and the SSB may be pre-configured, and then based on the association relationship, the target SSB corresponding to the target CSI-RS may be determined.

It should be noted that the full name of SSB is Synchronization Signal Block, which specifically refers to Synchronization/Physical Broadcast Channel (PBCH) block, because synchronization signal and PBCH can be packaged and processed in a unified manner at the physical layer, so the synchronization signal and PBCH are collectively called SSB.

Wherein, the synchronization signal may include a primary synchronization signal (PSS) and a secondary synchronization signal (SSS), and PBCH may include a PBCH demodulation reference signal (DMRS) and PBCH data.

In addition, the order of execution of step S2 and step S3 can be set as needed. For example, step S2 can be executed first, and then step S3 can be executed, or step S3 can be executed first, and then step S2 can be executed, or steps S2 and S2 can be executed simultaneously.

In step S4, a random access preamble and a random access occasion associated with the target SSB are determined.

In an embodiment, association relationships between SSB and the random access preamble as well as between SSB and the random access occasion (i.e. PRACH occasion) can be pre-configured, and then based on the association relationships, the random access preamble and the random access occasion associated with the target SSB can be determined.

It should be noted that there may be one or more random access preambles associated with the SSB, and there may be one or more random access occasions associated with the SSB. In the case where the SSB is associated with a plurality of random access preambles, the user equipment can select one preamble from the plurality of preambles to perform the random access as needed. Accordingly, in the case where the SSB is associated with a plurality of random access occasions, the user equipment may select one random access occasion from the plurality of random access occasions to perform the random access according to needs.

In step S5, the random access is initiated on the target beam based on the random access preamble and the random access occasion.

In an embodiment, after determining the target beam as well as the random access preamble and the random access occasion, a preamble may be sent to the base station at the random access occasion (PRACH occasion) on the target beam, thereby initiating the random access.

In the related art, when the user equipment initiates contention-based random access, the user equipment needs to determine whether or not the signal quality of the beam meets the requirements according to the measurement result of the SSB. However, in some cases, the user equipment being unable to obtain the measurement result of the SSB for the downlink BWP.

For example, in the related art, the user equipment needs to measure a Cell Defining (CD) SSB to obtain the measurement result of the SSB, but the CD SSB is only located in a certain position of the initial downlink BWP (that is, a downlink BWP which is configured for the user equipment by the base station when a communication connection is established between the user equipment and the base station). Furthermore, the user equipment can obtain the measurement results of the SSB for other downlink BWPs, only when the other downlink BWPs overlap with the initial downlink BWP and the overlapped parts include the position of the CD SSB.

However, not all BWPs overlap with the initial downlink BWP, and even if BWPs overlap with the initial downlink BWP, the overlapping part does not necessarily include the location of the CD SSB. This results in that for some BWPs, the user equipment cannot obtain the measurement results of the SSB. Or even if the overlapping part includes the location of the CD SSB, but the user equipment is not configured to measure the SSB, the user equipment cannot obtain the measurement result of the SSB.

Based on the embodiments of the present disclosure, the beam can be determined according to the measurement result of the CSI-RS, and it is not necessary to determine the beam according to the measurement result of the SSB, thereby preventing the user equipment from failing to select a suitable beam for the random access due to the user equipment being unable to obtain the measurement result of the SSB for the downlink BWP, which ensures that the user equipment can select a beam that meets the requirements.

In addition, since the random access preamble and the random access occasion are not directly related to the CSI-RS, but are directly related to the SSB, so that the SSB corresponding to the CSI-RS can be further determined after the beam is determined, and then the random access preamble and random access occasion associated with the SSB can be determined, thus the user equipment can send the random access preamble to the base station at the random access occasion based on the beam that meets the requirements, in order to ensure the smooth progress of the random access process.

Figure 2:
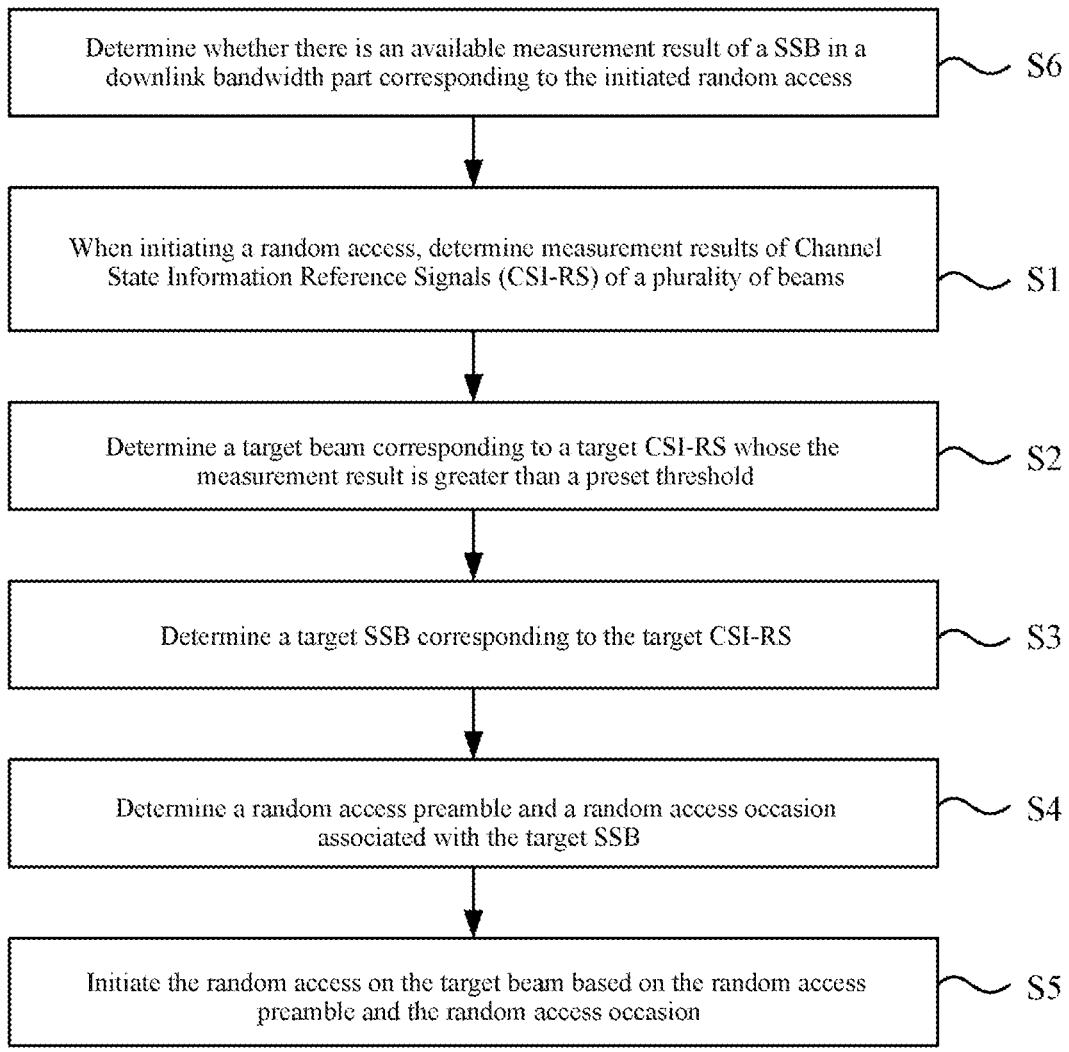
FIG. 2 is a schematic flowchart of another random access method according to an embodiment of the present disclosure.

FIG. 2 is a schematic flowchart of another random access method according to an embodiment of the present disclosure. As shown in FIG. 2, based on the embodiment shown in FIG. 1, the random access method further includes the following steps.

In step S6, before determining the measurement results of CSI-RSs of the plurality of beams, whether there is an available measurement result of SSB in a downlink bandwidth part corresponding to the initiated random access is determined;

Wherein, if there is no available measurement result of SSB in the downlink bandwidth part corresponding to the initiated random access, the measurement results of the CSI-RSs of the plurality of beams is determined.

In an embodiment, before determining the measurement results of CSI-RSs of the plurality of beams, whether there is an available measurement result of SSB in the downlink bandwidth part corresponding to the initiated random access can be determined firstly.

If there is an available measurement result of SSB in the downlink bandwidth part corresponding to the initiated random access, the user equipment can determine the beam based on the available measurement result of SSB, and directly determine the random access preamble and the random access occasion based on the SSB, so that it does not need to determine the beam based on the measurement result of CSI-RS.

Therefore, the measurement results of CSI-RSs of the plurality of beams can be determined only when there is no available measurement result of SSB in the downlink bandwidth part corresponding to the initiated random access, and then the beam can be determined according to the measurement results of CSI-RSs. Accordingly, the process of determining the beam, random access preamble and random access occasion can be simplified.

Wherein there is no available measurement result of SSB in the downlink bandwidth part corresponding to the initiated random access may mean that the downlink BWP of the initiated contention-based random access does not include CD SSB, or it may mean that the downlink BWP of the initiated contention-based random access includes CD SSB, but the user equipment is not configured to measure the SSB.

It should be noted that the downlink bandwidth part corresponding to the random access may include multiple situations, for example, including but not limited to the following two situations: the downlink bandwidth part used to transmit a second message (MSG2) of the random access can be determined as the downlink bandwidth part corresponding to the random access; the downlink bandwidth part with the same identifier as the uplink bandwidth part of used to transmit a first message (MSG1) of the random access can be determined as the downlink bandwidth part corresponding to the random access.

Figure 3:
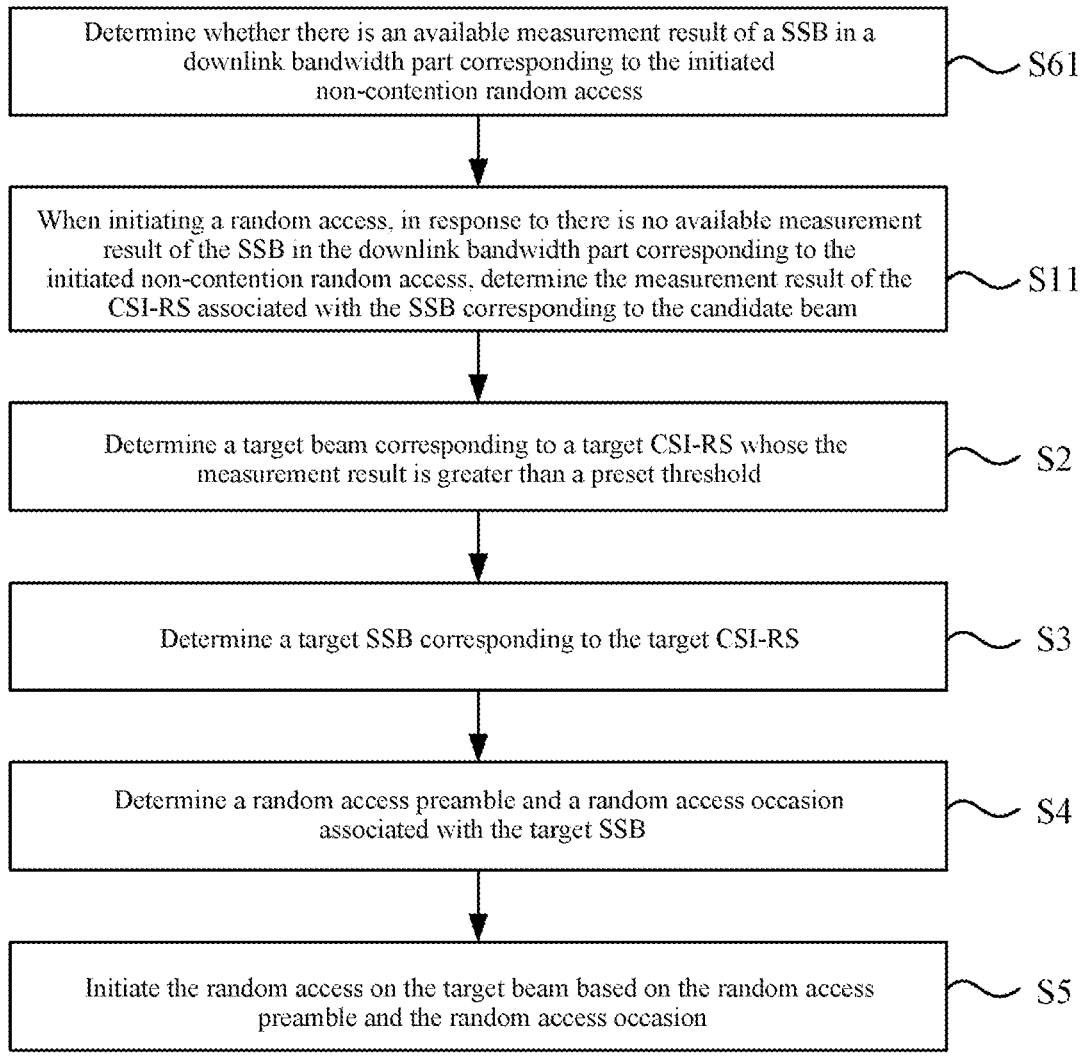
FIG. 3 is a schematic flowchart of yet another random access method according to an embodiment of the present disclosure.

FIG. 3 is a schematic flowchart of yet another random access method according to an embodiment of the present disclosure. As shown in FIG. 3, based on the embodiment shown in FIG. 2, if the initiated random access is a non-contention random access triggered due to beam failure recovery (BFR), and a reference signal resource of a candidate beam of the BFR is SSB, then said determining whether there is an available measurement result of SSB in the downlink bandwidth part corresponding to the initiated random access may include the following step.

In step S61, whether there is an available measurement result of SSB in the downlink bandwidth part corresponding to the initiated non-contention random access is determined.

If there is no available measurement result of SSB for the downlink bandwidth part corresponding to the initiated non-contention random access, said determining the measurement results of the channel state information measurement reference signals (CSI-RS) of the plurality of beams may include the following step.

In step S11, the measurement result of the CSI-RS associated with the SSB corresponding to the candidate beam is determined.

In an embodiment, if the initiated random access is a non-contention random access triggered by beam failure recovery (BFR), then the base station may pre-configure one or more candidate beams for the BFR, so that the user equipment can select a beam from these candidate beams for the BFR. If the reference signal resource of the candidate beam is SSB, then the quality of the candidate beam needs to be determined based on the measurement result of the SSB.

In this case, since the random access is a non-contention random access, it can be determined whether there is an available measurement result of SSB in the downlink bandwidth part of the initiated non-contention random access, thereby reducing the amount of downlink bandwidth part in which need to determine whether the measurement result of SSB is available. In addition, in the case of that the beam used to initiate the non-contention random access belongs to the candidate beam, the measurement result of CSI-RS associated with the corresponding SSB can be determined for the candidate beam, thereby reducing the amount of beams in which need to determine the measurement result of CSI-RS. Accordingly, the workload of the user equipment can be reduced.

Figure 4:
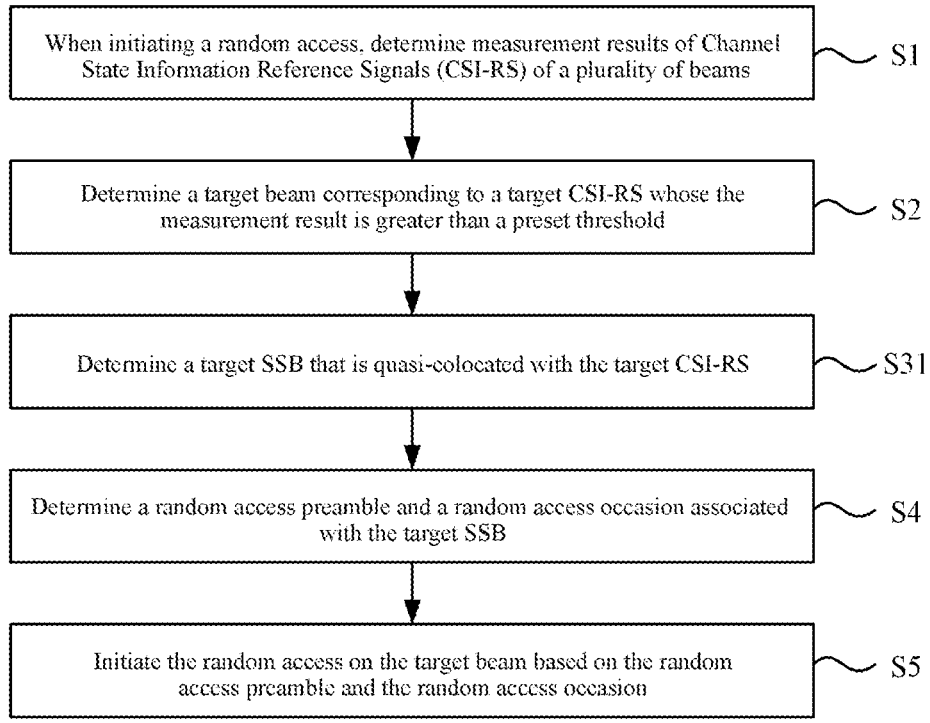
FIG. 4 is a schematic flowchart of yet another random access method according to an embodiment of the present disclosure.

FIG. 4 is a schematic flowchart of yet another random access method according to an embodiment of the present disclosure. As shown in FIG. 4, based on the embodiment shown in FIG. 1, said determining the target SSB corresponding to the target CSI-RS may include the following step.

In step S31, a target SSB which is quasi-colocated (QCL) with the target CSI-RS is determined.

In one embodiment, since the target beam is determined based on the target CSI-RS, and there may be some difference between the target beam corresponding to the target CSI-RS and the beam corresponding to the target SSB, the random access preamble and the random access occasion determined based on the target beam are suitable for the random access on the beam corresponding to the target SSB. If the difference between the target beam corresponding to the target CSI-RS and the beam corresponding to the target SSB is too large, the target beam may not be suitable for the random access performed based on the random access preamble and the random access occasion.

When determining the target SSB corresponding to the target CSI-RS, the determination can be made based on quasi-colocation, so that the beam corresponding to the determined target SSB has a small difference with the target beam corresponding to the target CSI-RS, thereby making the target beam is suitable for performing the random access according to the random access preamble and the random access occasion, so as to ensure the smooth progress of the random access.

Furthermore, the quasi-colocation can be determined based on the following five parameters: Doppler frequency shift, Doppler spread, spatial reception parameters, average delay, delay spread. CSI-RS and SSB can have a quasi-colocation relationship regarding to one or more parameters mentioned above. Taking the Doppler frequency shift as an example, the target CSI-RS and the target SSB have a quasi-colocation relationship in terms of the Doppler frequency shift, which refers to assume that the Doppler frequency shift of the target CSI-RS and the Doppler frequency shift of the target SSB can have the same value.

In an embodiment, the quasi-colocation relationship between CSI-RS and SSB may be carried by the base station through a Radio Resource Control (RRC) message and transmitted to the user equipment. For example, the quasi-colocation relationship can be existed in the configuration message of the CSI-RS resource. In this case, the quasi-colocation relationship can be identified by the TCI (transmission configuration indicator)-State ID, and the quasi-colocation relationship identified by the TCI-State ID can be configured in Physical Downlink Shared Channel Configuration (PDSCH-config) sent by the base station to the user equipment.

In addition to the above manner, the quasi-colocation relationship may also be included in the Control Resource Set sent by the base station to the user equipment, or may be included in the CSI-RS resource configuration for the mobility measurement, which is sent by the base station to the user equipment.

Figure 5:
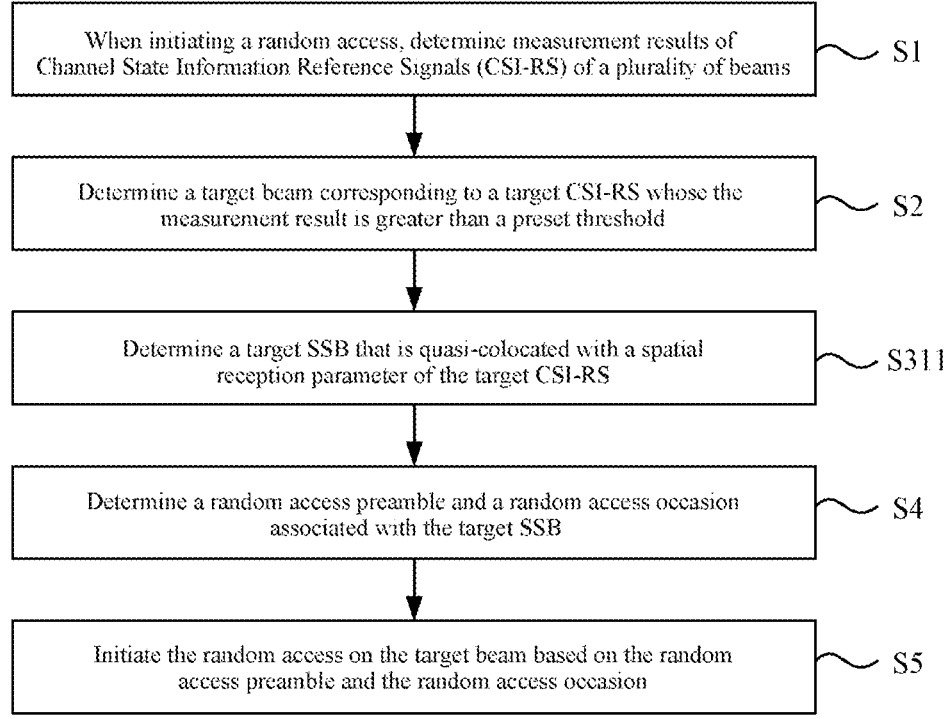
FIG. 5 is a schematic flowchart of yet another random access method according to an embodiment of the present disclosure.

FIG. 5 is a schematic flowchart showing another random access method according to an embodiment of the present disclosure. As shown in FIG. 5, on the basis of the embodiment shown in FIG. 1, said determining the target SSB quasi-colocated with the target CSI-RS may include the following step S311.

In step S311, a target SSB which is quasi-colocated with a spatial reception parameter of the target CSI-RS is determined.

In an embodiment, it may be determine, according to the spatial reception parameter, whether the target CSI-RS and the target SSB satisfy quasi-colocation relationship. Because the spatial reception parameter can characterize a direction (or an angle) of the beam in space to a certain extent, that is, when the target CSI-RS and the target SSB are quasi-colocated on the spatial reception parameters, the target beam corresponding to the target CSI-RS and the beam corresponding to the target SSB have relatively close spatial directions. Since the beams with the same direction in space have more similar properties, it is ensured that the target beam is more suitable for the random access performed according to the random access preamble and the random access occasion to a large extent.

Figure 6:
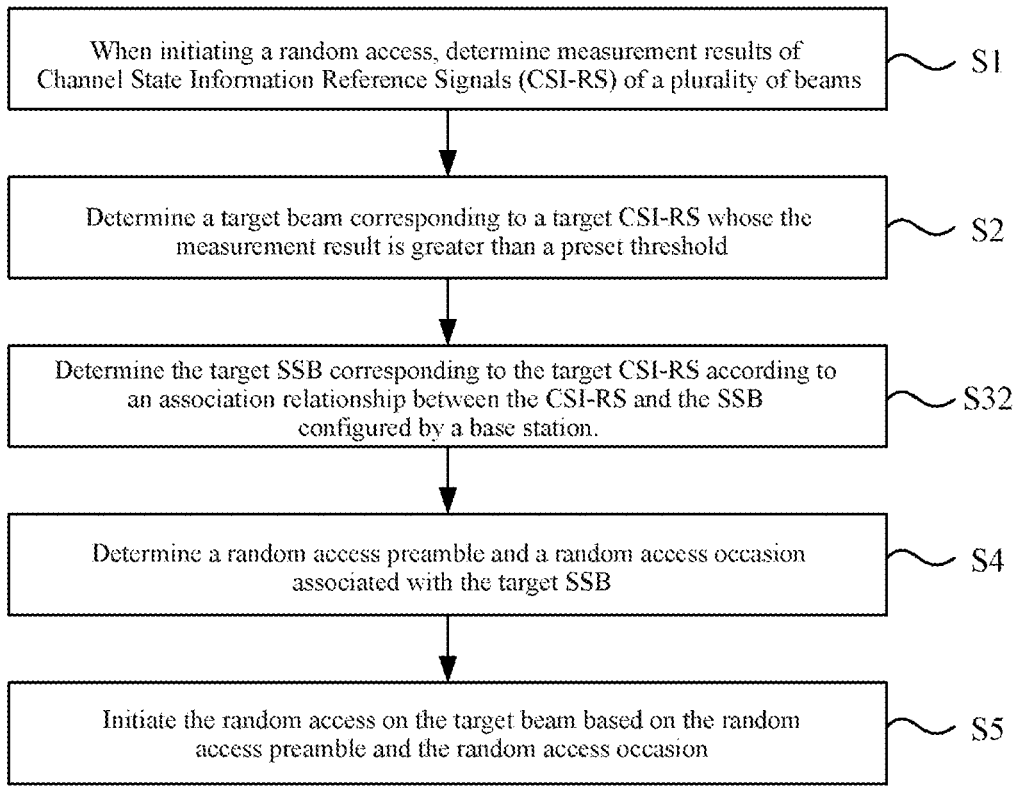
FIG. 6 is a schematic flowchart of yet another random access method according to an embodiment of the present disclosure.

FIG. 6 is a schematic flowchart showing yet another random access method according to an embodiment of the present disclosure. As shown in FIG. 6, on the basis of the embodiment shown in FIG. 1, said determining the target SSB corresponding to the target CSI-RS may include the following step S32.

In step S32, the target SSB corresponding to the target CSI-RS is determined according to an association relationship between the CSI-RS and the SSB configured by the base station.

In one embodiment, in addition to determining the target SSB corresponding to the target CSI-RS based on the quasi-colocation according to the embodiment shown in FIG. 4, the target SSB corresponding to the target CSI-RS may also be determined according to the association relationship between the CSI-RS and the SSB configured by the base station. For example, the association relationship may be used to indicate the SSB corresponding to each CSI-RS, wherein the association relationship may be carried by the base station through an RRC message and sent to the user equipment. For example, the association relationship may be located in the CSI-RS resource or located in the Radio Link Monitoring (RLM) resource, or located in Radio Resource Management (RRM) resource.

Optionally, the preset threshold is determined based on a radio resource control message sent by the base station.

In an embodiment, the preset threshold referenced when determining the target CSI-RS may be carried by the base station by sending an RRC message and sent to the user equipment. For example, the association relationship may be located in the CSI-RS resource, in RLM resource, or in RRM resource.

In an embodiment, if the above preset threshold is not explicitly configured through the RRC message, the user equipment may first determine the threshold corresponding to the measurement result (for example, RSRP) of the target SSB, that is, determine the threshold referenced by the beam according to the measurement result of the target SSB, and then scale the threshold corresponding to the measurement result of the target SSB based on Power Control Offset SS (Pc-SS) in the CSI-RS resource configuration, so as to determine the preset threshold (for example, SSB-RSRP-Pc-SS).

The present disclosure also provides an embodiment of a random access device, which is corresponding to the foregoing embodiment of the random access method.

Figure 7:
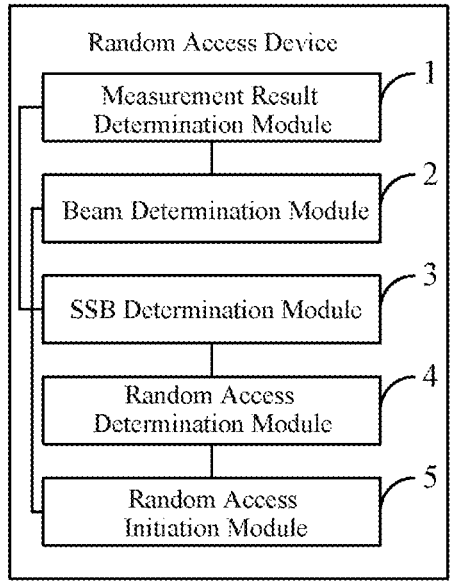
FIG. 7 is a schematic block diagram of a random access device according to an embodiment of the present disclosure.

FIG. 7 is a schematic block diagram showing a random access device according to an embodiment of the present disclosure. The random access device shown in this embodiment can be applied to user equipment, such as mobile phones, tablet computers, smart wearable devices (bracelets, watches, helmets, glasses, etc.). The user equipment can communicate with a base station, for example, communicate with base stations based on LTE, and it can also communicate with base stations based on NR.

As shown in FIG. 7, the random access device includes a measurement result determination module 1, a beam determination module 2, a SSB determination module 3, a random access determination module 4, and a random access initiation module 5.

The measurement result determination module 1 is configured to determine measurement results of Channel State Information Reference Signals (CSI-RS) of a plurality of beams when initiating a random access.

The beam determination module 2 is configured to determine a target beam corresponding to a target CSI-RS, wherein the measurement result of the target CSI-RS is greater than a preset threshold.

The SSB determination module 3 is configured to determine a target synchronization signal block (SSB) corresponding to the target CSI-RS.

The random access determination module 4 is configured to determine a random access preamble and a random access occasion associated with the target SSB;

The random access initiation module 5 is configured to initiate the random access on the target beam based on the random access preamble and the random access occasion.

Figure 8:
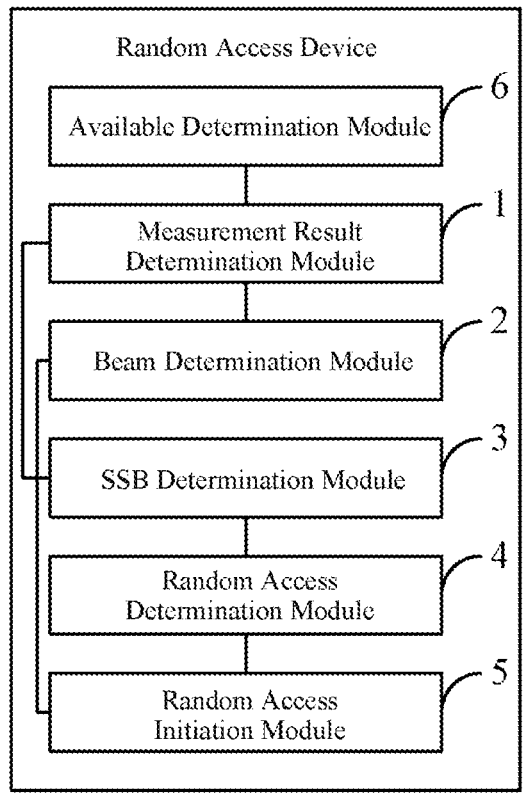
FIG. 8 is a schematic block diagram of another random access device according to an embodiment of the present disclosure.

FIG. 8 is a schematic block diagram showing another random access device according to an embodiment of the present disclosure. As shown in FIG. 8, based on the embodiment shown in FIG. 7, the device further includes an available determination module 6.

The available determination module 6 is configured to before determining the measurement results of CSI-RSs of the plurality of beams by the measurement result determination module 1, determine whether there is an available measurement result of a SSB in a downlink bandwidth part corresponding to the initiated random access.

Wherein, if there is no available measurement result of the SSB in the downlink bandwidth part corresponding to the initiated random access, the measurement result determination module 1 is configured to determine the measurement results of the CSI-RSs of the plurality of beams.

Optionally, if the initiated random access is a non-contention random access triggered due to beam failure recovery (BFR), and a reference signal resource of a candidate beam of the BFR is the SSB, the available determination module 6 is configured to determine whether there is the available measurement result of the SSB in a downlink bandwidth part corresponding to the initiated random access comprising.

Furthermore, in response to there is no available measurement result of the SSB in the downlink bandwidth part corresponding to the initiated non-contention random access, the measurement result determination module 1 is configured to determine the measurement result of the CSI-RS associated with the SSB corresponding to the candidate beam.

Figure 9:
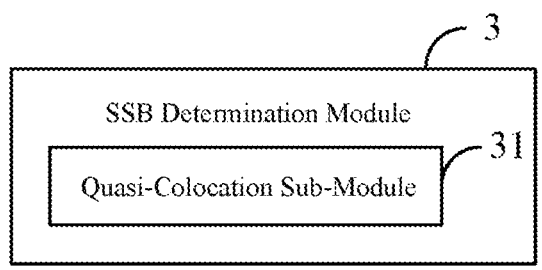
FIG. 9 is a schematic block diagram showing an SSB determination module according to an embodiment of the present disclosure.

FIG. 9 is a schematic block diagram showing an SSB determination module according to an embodiment of the present disclosure. As shown in FIG. 9, based on the embodiment shown in FIG. 1, the SSB determination module 3 includes a quasi-colocation sub-module 31, which is configured to determine a target SSB that is quasi-colocated with the target CSI-RS.

Optionally, the quasi-colocation sub-module 31 is configured to determine a target SSB that is quasi-colocated with a spatial reception parameter of the target CSI-RS.

Figure 10:
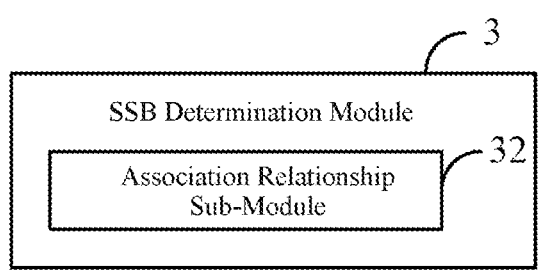
FIG. 10 is a schematic block diagram showing another SSB determination module according to an embodiment of the present disclosure.

FIG. 10 is a schematic block diagram showing another SSB determination module according to an embodiment of the present disclosure. As shown in FIG. 10, on the basis of the embodiment shown in FIG. 1, the SSB determination module 3 includes an association relationship sub-module 32 which is configured to determine the target SSB corresponding to the target CSI-RS according to an association relationship between the CSI-RS and the SSB configured by a base station.

Optionally, the preset threshold is determined based on a radio resource control message sent by the base station.

With regard to the device in the above embodiment, the specific manner in which each module performs operations has been described in detail in the embodiments of related methods, and will not be elaborated here.

For the device embodiment, since it basically corresponds to the method embodiment, the relevant part can be referred to the description of the method embodiment. The device embodiments described above are only schematic, wherein the units described as separate components may or may not be physically separated, and the components displayed as units may or may not be physical units, that is, they may be located in one place, or they may be distributed to multiple network elements. Some or all of the modules may be selected according to actual needs to achieve the purpose of the solution of this embodiment. Those of ordinary skill in the art can understand and implement without paying creative labor.

An embodiment of the present disclosure also proposes an electronic device, the electronic device includes: a processor; and memory for storing instructions executable by the processor; wherein the processor is configured to implement the steps in the method according to any one of the above embodiments.

An embodiment of the present disclosure also proposes a computer-readable storage medium having computer instructions stored thereon, when the instructions are executed by a processor, the steps in the method realizing any one of the above embodiments are implemented.

Figure 11:
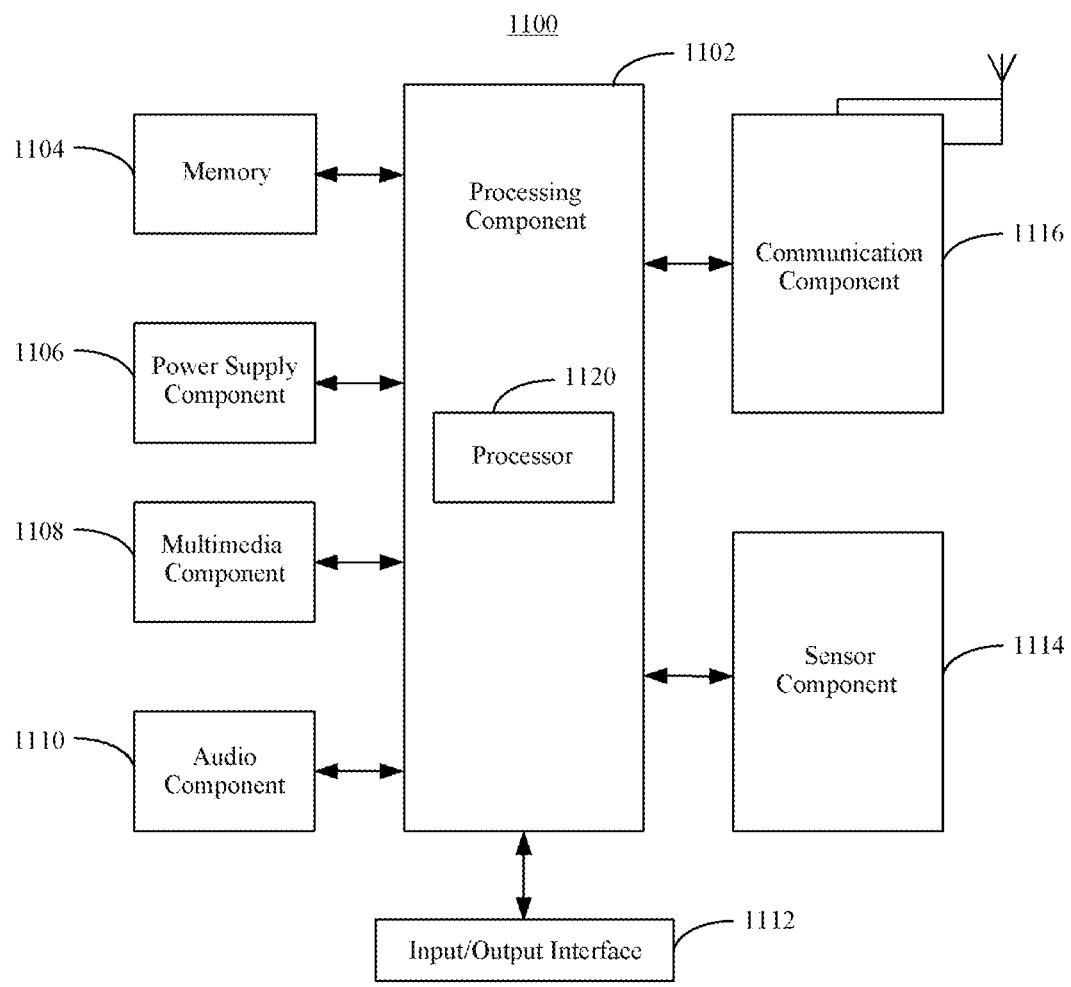
FIG. 11 is a schematic block diagram showing an apparatus for random access according to an embodiment of the present disclosure.

FIG. 11 is a schematic block diagram showing an apparatus 1100 for a random access according to an embodiment of the present disclosure. For example, the apparatus 1100 may be a mobile phone, a computer, a digital broadcasting terminal, a messaging device, a game console, a tablet device, a medical device, a fitness device, a personal digital assistant, etc.

Referring to FIG. 11, the apparatus 1100 may include one or more of the following components: a processing component 1102, memory 1104, a power supply component 1106, a multimedia component 1108, an audio component 1110, an input/output (I/O) interface 1112, a sensor Components 1114, and communication components 1116.

The processing component 1102 generally controls the overall operations of the apparatus 1100, such as operations associated with display, telephone calls, data communication, camera operations, and recording operations. The processing component 1102 may include one or more processors 1120 to execute instructions to complete all or part of the steps in the above methods. In addition, the processing component 1102 may include one or more modules to facilitate interaction between the processing component 1102 and other components. For example, the processing component 1102 may include a multimedia module to facilitate interaction between the multimedia component 1108 and the processing component 1102.

The memory 1104 is configured to store various types of data to support operations at the apparatus 1100. Examples of these data include instructions for any application or method operating on the apparatus 1100, contact data, phone book data, messages, pictures, videos, and so on. The memory 1104 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 1106 provides power to various components of the apparatus 1100. The power supply component 1106 may include a power supply management system, one or more power supplies, and other components associated with generating, managing, and distributing power for the apparatus 1100.

The multimedia component 1108 includes a screen between the apparatus 1100 and the user that provides an output interface. In some embodiments, the screen may include a liquid crystal display (LCD) and a touch panel (TP). If the screen includes a touch panel, then the screen may be implemented as a touch screen to receive input signals from the user. The touch panel includes one or more touch sensors, to sense touching, swiping, and gestures on the touch panel. The touch sensor may not only sense the boundary of the touching action or swiping action, but also detect the duration and pressure related to the touching action or swiping operation. In some embodiments, the multimedia component 1108 includes a front camera and/or a rear camera. When the apparatus 1100 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 1110 is configured to output and/or input audio signals. For example, the audio component 1110 includes a microphone (MIC). When the apparatus 1100 is in an operation mode, such as a call mode, a recording mode, and a voice recognition mode, the microphone is configured to receive an external audio signal. The received audio signal may be further stored in the memory 1104 or sent via the communication component 1116. In some embodiments, the audio component 1110 further includes a speaker for outputting audio signals.

The I/O interface 1112 provides an interface between the processing component 1102 and a peripheral interface module. The peripheral interface module may be a keyboard, a click wheel, a button and so on. These buttons may include, but are not limited to: home button, volume button, start button, and lock button.

The sensor assembly 1114 includes one or more sensors for providing the status assessment of various aspects for the apparatus 1100. For example, the sensor component 1114 can detect the on/off state of the apparatus 1100, and the relative positioning of the components, for example, the component is a display and a keypad of the apparatus 1100, and the sensor component 1114 can also detect the position change of the apparatus 1100 or a component of the apparatus 1100, the presence or absence of user contact with the apparatus 1100, the orientation or acceleration/deceleration of the apparatus 1100, and the temperature change of the apparatus 1100. The sensor assembly 1114 may include a proximity sensor configured to detect the presence of nearby objects without any physical contact. The sensor assembly 1114 may also include a light sensor, such as a CMOS or CCD image sensor, for use in imaging applications. In some embodiments, the sensor assembly 1114 may also include an acceleration sensor, a gyro sensor, a magnetic sensor, a pressure sensor, or a temperature sensor.

The communication component 1116 is configured to facilitate wired or wireless communication between the apparatus 1100 and other devices. The apparatus 1100 can access a wireless network based on a communication standard, such as Wi-Fi, 2G, or 3G, or a combination thereof. In an exemplary embodiment, the communication component 1116 receives a broadcast signal or broadcast related information from an external broadcast management system via a broadcast channel. In an exemplary embodiment, the communication component 1116 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 1100 may be implemented by one or more application specific integrated circuits (ASICs), digital signal processors (DSPs), digital signal processing devices (DSPDs), programmable logic devices (PLDs), Field programmable gate array (FPGA), controller, microcontroller, microprocessor or other electronic components, to execute the methods described in any of the above embodiments.

In an exemplary embodiment, there is also provided a non-transitory computer-readable storage medium including instructions, such as memory 1104 including instructions, which can be executed by the processor 1120 of the apparatus 1100 to complete the above method. For example, the non-transitory computer-readable storage medium may be ROM, random access memory (RAM), CD-ROM, magnetic tape, floppy disk, optical data storage device, or the like.

After considering the description and practice of the disclosure disclosed herein, those skilled in the art will easily think of other implementations of the disclosure. The present application is intended to cover any variations, usage, or adaptive changes of the present disclosure that follow the general principles of the present disclosure and include common general knowledge or customary technical means in the technical field not disclosed in the present disclosure. The description and examples are to be considered exemplary only, and the true scope and spirit of this disclosure are pointed out by the following claims.

It should be understood that the present disclosure is not limited to the precise structure that has been described above and shown in the drawings, and various modifications and changes can be made without departing from the scope thereof. The scope of the present disclosure is limited only by the appended claims.

It should be noted that in the present application, relational terms such as first and second are used only to distinguish one entity or operation from another entity or operation, and do not necessarily require or imply there has any such actual relationship or order between these entities or operations. The terms "include", "comprise", or any other variant thereof are intended to cover non-exclusive inclusion, so that a process, method, article, or equipment that includes a series of elements comprises not only those elements, but also others elements that are not explicitly listed, or also comprises elements inherent to such process, method, article, or equipment. Without more restrictions, the element defined by the sentence "include one . . . " does not exclude that there are other identical elements in the process, method, article or equipment that includes the element.

The methods and devices provided by the embodiments of the present invention have been described in detail above. Specific examples in the present application are used to explain the principles and implementations of the present invention. The descriptions of the above embodiments are only used to help understand the present invention and its core idea; meanwhile, for those of ordinary skill in the art, according to the idea of the present invention, there will be changes in the specific implementation and application scope. In summary, the content of this specification should not be understood as a limitation of invention.

What is claimed is:

1. A random access method, comprising:
in response to initiating a random access, determining measurement results of Channel State Information Reference Signals (CSI-RS) of a plurality of beams;
determining a target beam corresponding to a target CSI-RS of which the measurement result is greater than a preset threshold;
determining a target synchronization signal block (SSB) corresponding to the target CSI-RS;
determining a random access preamble and a random access occasion associated with the target SSB; and
initiating the random access on the target beam based on the random access preamble and the random access occasion;
wherein the method further comprises, before determining the measurement results of CSI-RSs of the plurality of beams, determining whether there is an available measurement result of an SSB in a downlink bandwidth part corresponding to the initiated random access; and
wherein in response to there is no available measurement result of the SSB in the downlink bandwidth part corresponding to the initiated random access, the method further comprises determining the measurement results of the CSI-RSs of the plurality of beams,
wherein in response to that the initiated random access is a non-contention random access triggered due to beam failure recovery (BFR), and a reference signal resource of a candidate beam of the BFR is the SSB, said determining whether there is the available measurement result of the SSB in the downlink bandwidth part corresponding to the initiated random access comprising:
determining whether there is an available measurement result of the SSB in a downlink bandwidth part corresponding to the initiated non-contention random access;

wherein, in response to there is no available measurement result of the SSB in the downlink bandwidth part corresponding to the initiated non-contention random access, said determining the measurement results of the CSI-RSs of the plurality of beams comprising:
determining the measurement result of the CSI-RS associated with the SSB corresponding to the candidate beam.

2. The method according to claim 1, wherein said determining the target SSB corresponding to the target CSI-RS comprising:
determining a target SSB that is quasi-colocated with the target CSI-RS.

3. The method according to claim 2, wherein said determining the target SSB quasi-colocated with the target CSI-RS comprising:
determining a target SSB that is quasi-colocated with a spatial reception parameter of the target CSI-RS.

4. The method according to claim 1, wherein said determining the target SSB corresponding to the target CSI-RS comprising:
determining the target SSB corresponding to the target CSI-RS according to an association relationship between the CSI-RS and the SSB configured by a base station.

5. The method according to claim 1, wherein the preset threshold is determined based on a radio resource control message sent by a base station.

6. An electronic device, comprising:
a processor; and
memory for storing instructions executable by the processor;
wherein the processor is configured to:
in response to initiating a random access, determine measurement results of Channel State Information Reference Signals (CSI-RS) of a plurality of beams;
determine a target beam corresponding to a target CSI-RS of which the measurement result is greater than a preset threshold;
determine a target synchronization signal block (SSB) corresponding to the target CSI-RS;
determine a random access preamble and a random access occasion associated with the target SSB;
initiate the random access on the target beam based on the random access preamble and the random access occasion;
before determining the measurement results of CSI-RSs of the plurality of beams, determine whether there is an available measurement result of an SSB in a downlink bandwidth part corresponding to the initiated random access; and
in response to there is no available measurement result of the SSB in the downlink bandwidth part corresponding to the initiated random access, determine the measurement results of the CSI-RSs of the plurality of beams,
wherein in response to that the initiated random access is a non-contention random access triggered due to beam failure recovery (BFR), and a reference signal resource of a candidate beam of the BFR is the SSB, the processor is further configured to:
determine whether there is an available measurement result of the SSB in a downlink bandwidth part corresponding to the initiated non-contention random access; and
in response to there is no available measurement result of the SSB in the downlink bandwidth part corresponding to the initiated non-contention random access, determine the measurement result of the CSI-RS associated with the SSB corresponding to the candidate beam.

7. The electronic device according to claim 6, wherein the processor is further configured to:
determine a target SSB that is quasi-colocated with the target CSI-RS.

8. The electronic device according to claim 6, wherein the processor is further configured to:
determine a target SSB that is quasi-colocated with a spatial reception parameter of the target CSI-RS.

9. The electronic device according to claim 6, wherein the processor is further configured to:
determine the target SSB corresponding to the target CSI-RS according to an association relationship between the CSI-RS and the SSB configured by a base station.

10. The electronic device according to claim 6, wherein the preset threshold is determined based on a radio resource control message sent by a base station.

11. The electronic device according to claim 6, the electronic device is configured to determine the beam according to the measurement result of the CSI-RS without determining the beam according to the measurement result of the SSB, thereby preventing the user equipment from failing to select a suitable beam to perform the random access resulting from the user equipment being unable to obtain the measurement result of the SSB for the downlink BWP, and ensuring that the user equipment selects a suitable beam that meets communication requirements.

12. The electronic device according to claim 11, wherein the random access preamble and the random access occasion are not directly related to the CSI-RS, but are directly related to the SSB, such that the SSB corresponding to the CSI-RS is further determined after the beam is determined, and then the random access preamble and random access occasion associated with the SSB are determined, thereby enabling the user equipment to send the random access preamble to a base station at the random access occasion based on the beam that meets the communication requirements, and ensuing a smooth progress of random access.

* * * * *